United States Patent
Youn et al.

(10) Patent No.: US 9,710,231 B2
(45) Date of Patent: Jul. 18, 2017

(54) MULTIPLE OUTPUT QUANTUM RANDOM NUMBER GENERATOR

(71) Applicant: ELECTRONICS AND TELECOMMUNICATIONS RESEARCH INSTITUTE, Daejeon (KR)

(72) Inventors: Chun Ju Youn, Daejeon (KR); Joong Seon Choe, Daejeon (KR); Jong Hoi Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/144,771

(22) Filed: May 2, 2016

(65) Prior Publication Data
US 2016/0335054 A1    Nov. 17, 2016

(30) Foreign Application Priority Data
May 13, 2015  (KR) .................. 10-2015-0066726

(51) Int. Cl.
| | | |
|---|---|---|
| G06F 7/38 | (2006.01) | |
| G06F 7/58 | (2006.01) | |
| G06N 99/00 | (2010.01) | |
| H04L 9/08 | (2006.01) | |

(52) U.S. Cl.
CPC .......... *G06F 7/588* (2013.01); *G06N 99/002* (2013.01); *H04L 9/0852* (2013.01)

(58) Field of Classification Search
CPC .................................................. G06N 99/002
USPC .................................................. 708/250–256
See application file for complete search history.

(56) References Cited

U.S. PATENT DOCUMENTS

| | | | | |
|---|---|---|---|---|
| 6,215,874 | B1* | 4/2001 | Borza | G06F 7/588 |
| | | | | 708/255 |
| 7,284,024 | B1* | 10/2007 | Trifonov | B82Y 10/00 |
| | | | | 708/256 |
| 7,974,540 | B2 | 7/2011 | Tomita et al. | |
| 8,554,814 | B2* | 10/2013 | Qi | G06F 7/588 |
| | | | | 708/255 |
| 2006/0288062 | A1 | 12/2006 | Luo et al. | |
| 2008/0065710 | A1 | 3/2008 | Fiorentino et al. | |
| 2008/0256153 | A1 | 10/2008 | Park et al. | |
| 2010/0217789 | A1* | 8/2010 | Saitoh | H04L 9/0852 |
| | | | | 708/255 |
| 2012/0221615 | A1* | 8/2012 | Cerf | G06F 7/588 |
| | | | | 708/250 |

(Continued)

FOREIGN PATENT DOCUMENTS

JP    2005-250714 A    9/2005

OTHER PUBLICATIONS

Feihu Xu et al., "Ultrafast quantum random number generation based on quantum phase fluctuations", Optics Express, vol. 20, No. 11, pp. 12366-12377, May 21, 2012.

*Primary Examiner* — Tan V. Mai
(74) *Attorney, Agent, or Firm* — Rabin & Berdo, P.C.

(57) ABSTRACT

A multiple output quantum random number generator coherently measures an optical source noise and outputs a random number sequence based on the independent and coherent measurement of optical source noise. Therefore, it is possible to output a random number sequence at a high speed and to perform multiple outputs.

11 Claims, 3 Drawing Sheets

(56) References Cited

U.S. PATENT DOCUMENTS

| | | | |
|---|---|---|---|
| 2013/0318139 A1 | 11/2013 | Park et al. | |
| 2014/0337400 A1* | 11/2014 | Chong | G06F 7/588 708/255 |
| 2016/0117149 A1* | 4/2016 | Caron | G06F 7/588 708/255 |

* cited by examiner

MULTIPLE OUTPUT QUANTUM RANDOM NUMBER GENERATOR

CROSS-REFERENCE TO RELATED APPLICATION

This application claims priority to and the benefit of Korean Patent Application No. 10-2015-0066726, filed on May 13, 2015, in the Korean Intellectual Property Office, the entire contents of which are incorporated herein by reference in their entirety.

BACKGROUND

1. Field

An embodiment of the present invention relates to a quantum random number generator.

2. Description of the Related Art

A random number generator has a large number of applications such as numerical simulation, codes, quantum cryptography, lottery and the like. When the random number generator is based on software and/or hardware, such a system is deterministic system. Thus, when an initial value and a peripheral environment variable are known, a random number sequence may be estimated, and it is difficult to regard the random number generator as a true random number generator. On the other hand, when the random number generator is based on a quantum physics, since a random number sequence may not be estimated, the random number generator may be regarded as the true random number generator. A quantum random number generator is used for quantum communications. For ultrahigh speed quantum communications, an ultrahigh speed true quantum random number generator is required. A conventional quantum random number generator is formed of a single photon light source and a single photon detector. Because the single photon detector is driven at a low speed of several decades of MHz, the speed of a conventional quantum random number generator is several decades of MHz.

A quantum random number generator (the U.S. Pat. No. 8,554,814 B2) based on a quantum phase noise of a laser light source was proposed as the quantum random number generator in which the single photon detector is not used. The suggested quantum random number generator converts a random phase noise of a light source into a amplitude noise by using a planar light wave circuit mach-zhender interferometer and measures the converted amplitude noise by an optical detector to form an ultrahigh speed quantum random number generating system of GHz.

However, the suggested quantum random number generator requires a mach-zhender interferometer in which a time difference between two paths is large (~500 ps) in order to measure a phase noise of a light source. Furthermore, temperature must be controlled in order to stably drive the mach-zhender interferometer and only one output is made.

SUMMARY

An embodiment of the present invention relates to a multiple output quantum random number generator.

In addition, an embodiment of the present invention relates to an ultrahigh speed multiple output quantum random number generator.

According to an embodiment of the present invention, it is possible to implement a multiple output quantum random number generator capable of coherently measuring an optical source noise and outputting a random number sequence based on the coherent measurement of the optical source noise.

A multiple output quantum random number generator according to the present invention may include an optical hybrid including first and second input ports to which optical source noises are respectively input, the optical hybrid configured to mix a first optical source noise input to the first input port and a second optical source noise input to the second input port and to divide a mixed optical source noise into an in-phase component and a quadrature component, a plurality of optical detectors configured to respectively convert optical source noises of in-phase components and optical source noises of quadrature components that are output from the optical hybrid into electric noises, a plurality of AD converters configured to respectively convert electric noises output from the plurality of optical detectors to digital values, and a random number extractor configured to post-process outputs of the AD converters to make a true random number sequence.

The random number extractor may output a random number sequence from which biased components of 0s and 1s are removed.

The first optical source noise and the second optical source noise may have the same polarization state.

The random number extractor may include a first channel configured to output a random number sequence generated based on an electric noise of an in-phase component sampled by one of the plurality of AD converters and a second channel configured to output a random number sequence generated based on an electric noise of a quadrature component sampled by one of the plurality of AD converters.

The multiple output quantum random number generator may further include a polarization splitter configured to divide an optical source noise into an X polarized component and a Y polarized component. In the optical hybrid, an optical source noise output from the polarization splitter may be input to at least one of the first input port and the second input port.

The multiple output quantum random number generator may further include an optical splitter configured to divide an optical source noise. At least one of two optical source noises divided by the optical splitter may be input to the optical hybrid.

Optical source noises input to the optical splitter may be X polarized or Y polarized. In the optical hybrid, two optical source noises divided by the optical splitter may be respectively input as a first optical source noise and a second optical source noise.

The multiple output quantum random number generator may further include at least one optical splitter configured to divide an optical source noise and a plurality of polarization splitter configured to divide an optical source noise divided by the optical splitter into an X polarized component and a Y polarized component.

The optical hybrid may include a first optical hybrid to which optical source noises of X polarized components respectively output from the plurality of polarization splitter are input and a second optical hybrid to which optical source noises of Y polarized components respectively output from the plurality of polarization splitter are input.

The plurality of optical detectors may respectively convert an optical source noise of an X polarized in-phase component output from a first optical hybrid, an optical source noise of an X polarized quadrature component output from a first optical hybrid, an optical source noise of a Y polarized in-phase component output from a second optical hybrid, and an optical source noise of a Y polarized quadrature component output from a second optical hybrid into electric noises.

The plurality of AD converters may respectively convert electric noises output from the plurality of optical detectors to digital values.

The random number extractor may post-process outputs of the AD converters to make a true random number sequence.

The random number extractor may include at least two channels among a first channel configured to output a random number sequence generated based on an electric noise of an X polarized in-phase component sampled by one of the plurality of AD converters, a second channel configured to output a random number sequence generated based on an electric noise of an X polarized quadrature component sampled by one of the plurality of AD converters, a third channel configured to output a random number sequence generated based on an electric noise of a Y polarized in-phase component sampled by one of the plurality of AD converters, and a fourth channel configured to output a random number sequence generated based on an electric noise of a Y polarized quadrature component sampled by one of the plurality of AD converters.

The multiple output quantum random number generator may further include at least one light source configured to generate the optical source noise.

The at least one light source may include a laser light source or a spontaneous emission light source.

According to an embodiment of the present invention, a true random number generator may perform multiple outputs.

In addition, according to an embodiment of the present invention, a random number sequence is output at an ultra-high speed of GHz.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
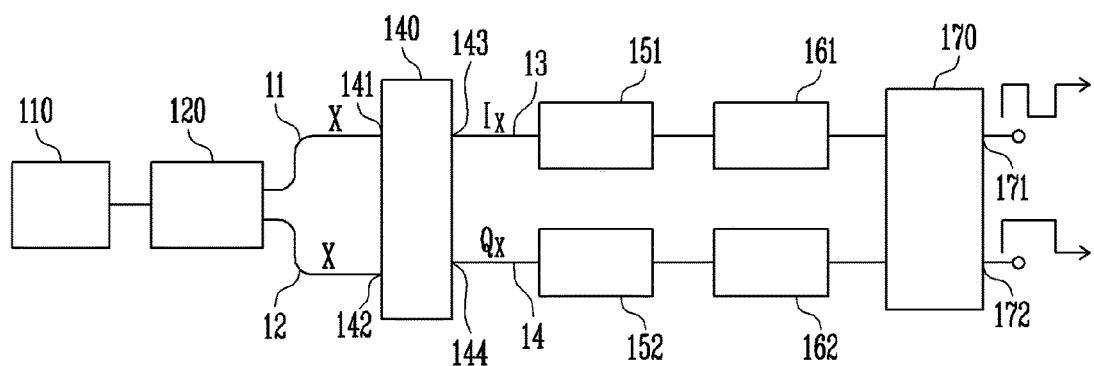
FIG. 1 is a block diagram illustrating an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Throughout this specification and the claims that follow, when it is described that an element is "connected" to another element, the element may be "directly connected" to the other element or "electrically connected" to the other element through a third element. In the accompanying drawings, a portion irrelevant to description of the present invention will be omitted for clarity. Like reference numerals refer to like elements throughout.

Hereinafter, embodiments will be described in detail so that those skilled in the art may easily perform the present invention with reference to the accompanying drawings.

FIG. 1 is a block diagram illustrating an embodiment of the present invention. A multiple output quantum random number generator according to the embodiment of the present invention includes a light source 110, an optical splitter 120 for dividing light, an optical hybrid 140 for mixing input light components and dividing a phase of the mixed light, first and second optical detectors 151 and 152 for converting optical source noises into electric noises, first and second analog-to-digital (AD) converters 161 and 162 for sampling the electric noises, and a random number extractor 170 for generating a true random number sequence based on the sampled electric noises.

The light source 110 outputs light including noise. The noise has a quantum characteristic. In addition, the light including the noise is polarized to have an X polarized component or a Y polarized component. In FIG. 1, an X polarized state is illustrated. Hereinafter, the X polarized state will be illustrated. However, the present invention is not limited thereto. The present invention may be applied to a Y polarized state.

Any well-known light source that outputs the light including the noise may be used as the light source 110. For example, the light source 110 may be a laser light source or a spontaneous emission light source. As an example of the spontaneous emission light source, the light source 110 may be a light emitting diode (LED).

The optical splitter 120 divides the noise output from the light source 110 into two paths. The X polarized optical source noise output from the light source 110 is divided by the optical splitter 120 and is output as a first optical source noise 11 and a second optical source noise 12. That is, in the optical splitter 120, the optical source noise is input through one input port and the divided optical source noises are output through two output ports.

The optical hybrid 140 mixes the input optical source noises, divides the mixed optical source noise into an in-phase component and a quadrature component on a cartesian coordinate plane, and outputs the in-phase component and the quadrature component on the cartesian coordinate plane. The optical hybrid 140 includes first and second input ports 141 and 142 to which the first optical source noise 11 and the second optical source noise 12 that are output from the optical splitter 120 are respectively input.

The first and second optical source noises 11 and 12 input to the optical hybrid 140 are mixed and are divided into an in-phase component I and a quadrature component Q so that the in-phase component I and the quadrature component Q are output. The optical hybrid 140 includes a first output port 143 from which an in-phase component 13 of the mixed X polarized noise is output and a second output port 144 from which a quadrature component 14 of the mixed X polarized noise is output. That is, the first output port 143 is an X polarized in-phase port and the second output port 144 is an X polarized quadrature port.

According to an embodiment, the optical hybrid 140 may have the same configuration as an optical hybrid included in a coherent optical receiver that recovers an optical signal phase modulated by an optical communication. The optical hybrid of the optical communication coherent optical receiver as an apparatus for optically recovering the phase modulated optical signal may include at least one of a coupler and a phase shifter. Since a detailed configuration of the optical hybrid is well-known, detailed description thereof will not be given.

The in-phase component 13 of the X polarized noise and the quadrature component 14 of the X polarized noise are respectively input to the first and second optical detectors 151 and 152 and are converted into electric noises. The in-phase component and the quadrature component of the X polarized noise that are respectively converted into the electric noises by the first and second optical detectors 151 and 152 are input to and sampled by the first and second AD converters 161 and 162.

The random number extractor 170 generates a random number sequence based on the in-phase component and the quadrature component of the X polarized noise respectively sampled by the first and second AD converters 161 and 162 and outputs the generated random number sequence to two channels 171 and 172. Since the in-phase component and the quadrature component of the X polarized noise are independent from each other, the in-phase component and the quadrature component of the X polarized noise may be separately measured. Therefore, the random number sequence may be output to the two channels 171 and 172.

The random number extractor 170 generates the random number sequence formed of 0 and 1 based on numbers of the in-phase component of the X polarized noise sampled by the first AD converter 161 and outputs the generated random number sequence through the first channel 171. In addition, the random number extractor 170 generates the random number sequence formed of 0 and 1 based on numbers of the quadrature component of the X polarized noise sampled by the second AD converter 162 and outputs the generated random number sequence through the second channel 172.

There may be various methods of arranging a plurality of 0s and a plurality of 1s based on the numbers output by the first and second AD converters 161 and 162 and generating the random number sequence. Since the methods of generating the random number sequence including 0s and 1s based on the predetermined numbers are well-known, detailed description thereof will not be given. Any well-known random number extraction algorithm for generating the unbiased random number sequence formed of 0s and 1s may be used as the random number extractor. The random number extractor outputs a true random number sequence from which biased components of 0s and 1s are removed.

Figure 2:
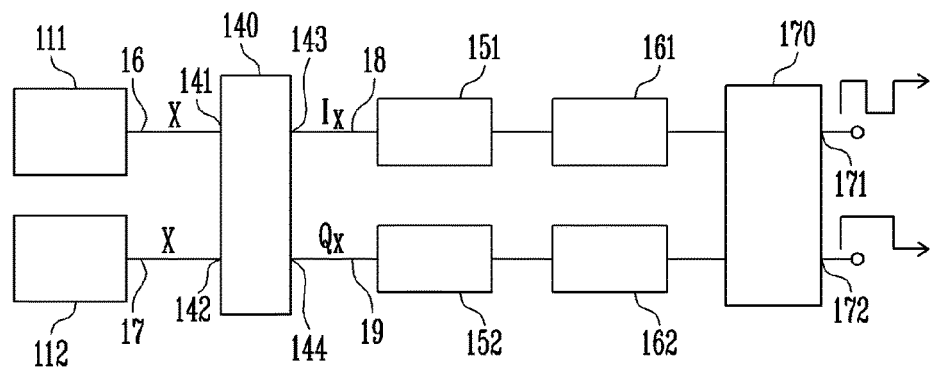
FIG. 2 is a block diagram illustrating another embodiment of the present invention.

FIG. 2 is a block diagram illustrating another embodiment of the present invention. A multiple output quantum random number generator according to another embodiment of the present invention includes first and second light sources 111 and 112, an optical hybrid 140 for mixing input light components and dividing a phase of the mixed light, first and second optical detectors 151 and 152 for converting optical source noises into electric noises, first and second analog-to-digital (AD) converters 161 and 162 for sampling the electric noises, and a random number extractor 170 for generating a random number sequence based on the sampled electric noises.

The first light source and the second light source 111 and 112 output light components including noises. The light output from the first light 111 and the light output from the second light 112 have the same polarization state. For example, both the first light source 111 and the second light source 112 may output X polarized light components or Y polarized light components.

In FIG. 2, an X polarized state is illustrated. Hereinafter, the X polarized state will be illustrated. However, the present invention is not limited thereto. The present invention may be applied to a Y polarized state. The first and second light sources 111 and 112 may be laser light sources or spontaneous emission light sources.

The optical hybrid 140 mixes the input optical source noises, divides the mixed optical source noise into an in-phase component and a quadrature component on a cartesian coordinate plane, and outputs the in-phase component and the quadrature component on the cartesian coordinate plane. The optical hybrid 140 includes first and second input ports 141 and 142 to which an X polarized first optical source noise 16 output from the first light source 111 and an X polarized second optical source noise 17 output from the second light source 112 are respectively input. The optical hybrid 140 has the same configuration as the optical hybrid of FIG. 1 and is denoted by the same reference number.

The first and second optical source noises 16 and 17 input to the optical hybrid 140 are mixed and are divided into an in-phase component I and a quadrature component Q so that the in-phase component I and the quadrature component Q are output. The optical hybrid 140 includes a first output port 143 from which an in-phase component 18 of the mixed X polarized noise is output and a second output port 144 from which a quadrature component 19 of the mixed X polarized noise is output. That is, the first output port 143 is an X polarized in-phase port and the second output port 144 is an X polarized quadrature port.

Since a configuration of the optical hybrid 140 is the same as that of the optical hybrid of FIG. 1, detailed description thereof will be omitted. In addition, configurations and functions of the first and second optical detectors 151 and 152, the first and second AD converters 161 and 162, and the random number extractor 170 are the same as those of the embodiment of FIG. 1. Therefore, the first and second optical detectors 151 and 152, the first and second AD converters 161 and 162, and the random number extractor 170 are denoted by the same reference numerals as those of the embodiment of FIG. 1 and detailed description thereof will not be given.

In the embodiment of FIGS. 1 and 2, the noise having one polarized component is divided into the in-phase component and the quadrature component so that the random number sequence is output to the two channels. Hereinafter, noise is divided into an X polarized component and a Y polarized component and is divided into an in-phase component and a quadrature component again so that the random number sequence is output through four channels.

Figure 3:
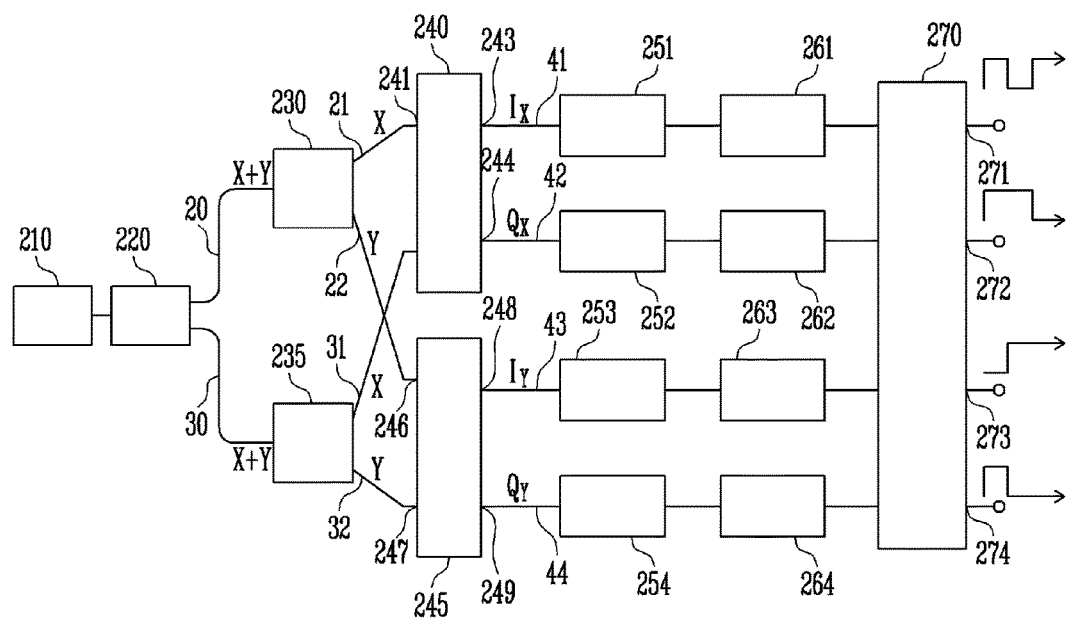
FIG. 3 is a block diagram illustrating another embodiment of the present invention.

FIG. 3 is a block diagram illustrating another embodiment of the present invention. A multiple output quantum random number generator according to another embodiment of the present invention includes a light source 210, an optical splitter 220 for dividing light, first and second polarization splitters 230 and 235 for polarization dividing input light, first and second optical hybrids 240 and 245 for mixing the input light components and phase dividing the mixed light, first to fourth optical detectors 251, 252, 253, and 254 for converting optical source noises into electric noises, first to fourth AD converters 261, 262, 263, and 264 for sampling the electric noises, and a random number extractor 270 for generating a random number sequence based on the sampled electric noises.

The light source 210 outputs light including noise. The noise has a quantum characteristic. That is, the light output from the light source 210 includes both an X polarized component and a Y polarized component. The light source 210 may be a laser light source or a spontaneous emission light source.

The optical splitter 220 divides the noise output from the light source 210 into a first optical source noise 20 and a second optical source noise 30. The noise input to the optical splitter includes both an X polarized component and a Y polarized component and is divided into two noises by the optical splitter. The first optical source noise 20 and the second optical source noise 30 that are output from the optical splitter 220 include both X polarized components and Y polarized components. In the optical splitter, optical source noise is input through one input port and the divided optical source noises are output through two output ports.

The first and second polarization splitters 230 and 235 divide optical source noises into X polarized components and Y polarized components and output the X polarized components and the Y polarized components. The first polarization splitter 230 includes an input port to which the first optical source noise 20 is input. In addition, the first polarization splitter 230 includes an X polarized output port from which a first optical source noise 21 of the X polarized component is output and a Y polarized output port from which a second optical source noise 22 of the Y polarized component is output.

The second polarization splitter 235 includes an input port to which the second optical source noise 30 is input from the optical splitter 220. In addition, the second polarization splitter 235 includes an X polarized output port from which a second optical source noise 31 of an X polarized component is output and a Y polarized output port from which a second optical source noise 32 of a Y polarized component is output.

The first and second optical hybrids 240 and 245 mix the input optical source noises, divide the mixed optical source noises into in-phase components and quadrature components on a cartesian coordinate plane, and outputs the in-phase components and the quadrature components on the cartesian coordinate plane. The first optical hybrid 240 divides the optical source noise of the X polarized component into the in-phase component and the quadrature component on the cartesian coordinate plane and the second optical hybrid 245 divides the optical source noise of the Y polarized component into the in-phase component and the quadrature component on the cartesian coordinate plane.

The first optical hybrid 240 includes first and second input ports 241 and 242 to which the optical source noises of the X polarized components are input and first and second output ports 243 and 244 from which the in-phase component and the quadrature component of the mixed optical source noise are respectively output.

The first optical source noise 21 of the X polarized component output from the first polarization splitter 230 is input to the first input port 241 and the second optical source noise 31 of the X polarized component output from the second polarization splitter 235 is input to the second input port 242.

The first optical hybrid 240 mixes the first optical source noise 21 of the X polarized component and the second optical source noise 31 of the X polarized component and divides the mixed optical source noise into the in-phase component I and the quadrature component Q so that the in-phase component I and the quadrature component Q are output. In the first output port 243, an in-phase component 41 of the mixed optical source noise is output to an X polarized in-phase port. In the second output port 244, a quadrature component 42 of the mixed optical source noise is output to an X polarized quadrature port.

The second optical hybrid 245 includes first and second input ports 246 and 247 to which the optical source noises of the Y polarized components are input and first and second output ports 248 and 249 from which the in-phase component and the quadrature component of the mixed optical source noise are respectively output.

The first optical source noise 22 of the Y polarized component output from the first polarization splitter 230 is input to the first input port 246 and the second optical source noise 32 of the X polarized component output from the second polarization splitter 235 is input to the second input port 247.

The second optical hybrid 245 mixes the first optical source noise 22 of the Y polarized component and the second optical source noise 32 of the Y polarized component and divides the mixed optical source noise into the in-phase component I and the quadrature component Q so that the in-phase component I and the quadrature component Q are output. In the first output port 248, an in-phase component 43 of the mixed optical source noise is output to a Y polarized in-phase port. In the second output port 249, a quadrature component 44 of the mixed optical source noise is output to a Y polarized quadrature port.

Since configurations of the first optical hybrid 240 and the second optical hybrid 245 are the same as the configuration of the optical hybrid 140 according to the embodiment of FIG. 1, detailed description thereof will be omitted.

The first to fourth optical detectors convert the input optical source noises into the electric noises. The first optical detector 251 converts the in-phase component 41 of the X polarized noise into the electric noise. The second optical detector 252 converts the quadrature component 42 of the X polarized noise into the electric noise. The third optical detector 253 converts the in-phase component 43 of the Y polarized noise into the electric noise. The fourth optical detector 254 converts the quadrature component 44 of the Y polarized noise into the electric noise.

The first to fourth AD converters sample the electric noises respectively output from the first to fourth optical detectors by an arbitrary integer. The first AD converter 261 samples the in-phase component of the X polarized electric noise output from the first optical detector and the second AD converter 262 samples the quadrature component of the X polarized electric noise output from the second optical detector. The third AD converter 263 samples the in-phase component of the Y polarized electric noise output from the third optical detector and the fourth AD converter 264 samples the quadrature component of the Y polarized electric noise output from the fourth optical detector.

The random number extractor 270 generates the random number sequence based on numbers of the in-phase and quadrature components of the X polarized noises and the in-phase and quadrature components of the Y polarized noises that are respectively sampled by the first to fourth AD converters and outputs the generated random number sequence through four channels 271, 272, 273, and 274. In addition, the random number extractor 270 outputs a true random number sequence from which the biased components of 0s and 1s are removed.

The random number extractor 270 generates the random number sequence formed of 0s and 1s based on the numbers of the in-phase component of the X polarized noise sampled by the first AD converter 261 and outputs the generated random number sequence through the first channel 271. The random number extractor 270 generates the random number sequence formed of 0s and 1s based on the numbers of the quadrature component of the X polarized noise sampled by the second AD converter 262 and outputs the generated random number sequence through the second channel 272. The random number extractor 270 generates the random number sequence formed of 0s and 1s based on the numbers of the sampled in-phase and quadrature components of the Y polarized noises and outputs the generated random number sequence through the third and fourth channels 273 and 274.

Since the methods of generating the random number sequence including 0s and 1s based on the predetermined numbers are well-known, detailed description thereof will not be given. Any well-known random number extraction algorithm for generating the unbiased random number sequence formed of 0s and 1s may be used as the random number extractor.

Since the in-phase component and the quadrature component of the optical source noise are independent from each other, the in-phase component and the quadrature component of the optical source noise may be separately measured. Since the optical source noise is divided into the X polarized component and the Y polarized component and the in-phase and quadrature components are independently measured by polarization, the random number sequence may be output through four channels. The random number extractor outputs a random number sequence from which biased components are removed.

Figure 4:
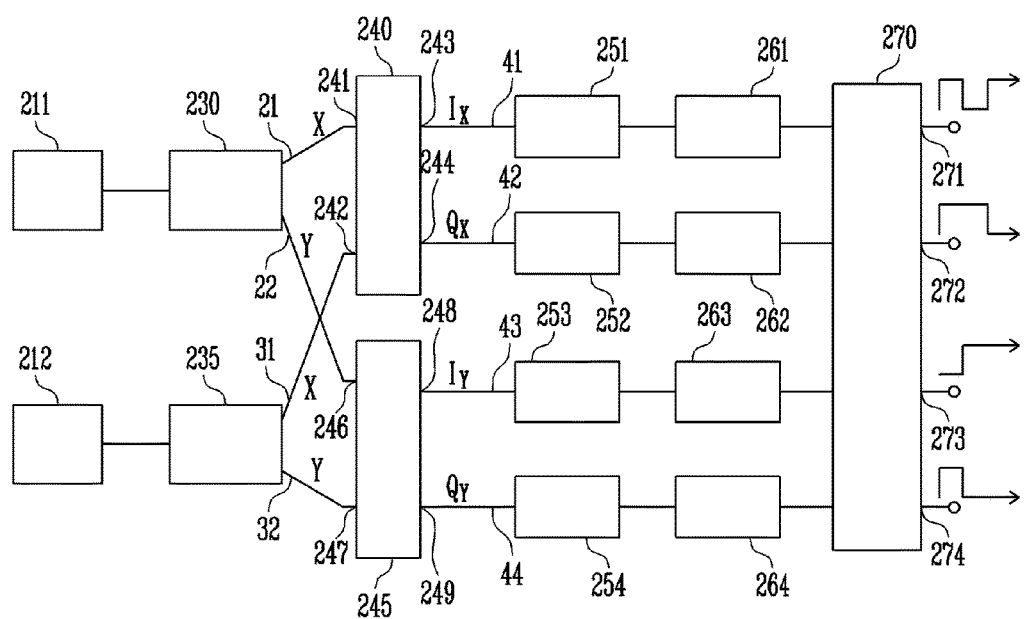
FIG. 4 is a block diagram illustrating another embodiment of the present invention.

FIG. 4 is a block diagram illustrating another embodiment of the present invention. A multiple output quantum random number generator according to another embodiment of the present invention includes first and second light sources 211 and 212, first and second polarization splitters 230 and 235 for polarization dividing input light components, first and second optical hybrids 240 and 245 for mixing the input light components and phase dividing the mixed light, first to fourth optical detectors 251, 252, 253, and 254 for converting optical source noises into electric noises, first to fourth AD converters 261, 262, 263, and 264 for sampling the electric noises, and a random number extractor 270 for generating a random number sequence based on the sampled electric noises.

The first and second light sources 211 and 212 output light components including noises. The noises have quantum characteristics. The light components output from the first and second light sources include both X polarized components and Y polarized components. The first and second light sources 211 and 212 may be laser light sources or spontaneous emission light sources.

The first and second polarization splitters 230 and 235 divide optical source noises into X polarized components and Y polarized components and output the X polarized components and the Y polarized components. The first polarization splitter 230 includes an input port to which the noise output from the first optical light source 211 is input. In addition, the first polarization splitter 230 includes an X polarized output port from which a first optical source noise 21 of the X polarized component is output and a Y polarized output port from which a second optical source noise 22 of the Y polarized component is output.

The second polarization splitter 235 includes an input port to which the noise output from the second light source 212 is input. In addition, the second polarization splitter 235 includes an X polarized output port from which a second optical source noise 31 of an X polarized component is output and a Y polarized output port from which a second optical source noise 32 of a Y polarized component is output.

The first and second optical hybrids 240 and 245 mix the input optical source noises, divide the mixed optical source noises into in-phase components and quadrature components on a cartesian coordinate plane, and outputs the in-phase components and the quadrature components on the cartesian coordinate plane. The first optical hybrid 240 divides the optical source noise of the X polarized component into the in-phase component and the quadrature component on the cartesian coordinate plane and the second optical hybrid 245 divides the optical source noise of the Y polarized component into the in-phase component and the quadrature component on the cartesian coordinate plane.

Since the first and second optical hybrids 240 and 245 have the same configuration as those of the first and second optical hybrids of FIG. 3, the first and second optical hybrids 240 and 245 are denoted by the same reference numerals as those of the first and second optical hybrids of FIG. 3 and detailed description thereof will be omitted. In addition, the first to fourth optical detectors 251, 252, 253, and 254, the first to fourth AD converters 261, 262, 263, and 264, and the random number extractor 270 have the same configurations and functions as those in the embodiment of FIG. 3. Therefore, the first to fourth optical detectors 251, 252, 253, and 254, the first to fourth AD converters 261, 262, 263, and 264, and the random number extractor 270 are denoted by the same reference numerals as those in the embodiment of FIG. 3 and detailed description thereof will be omitted.

Figure 5:
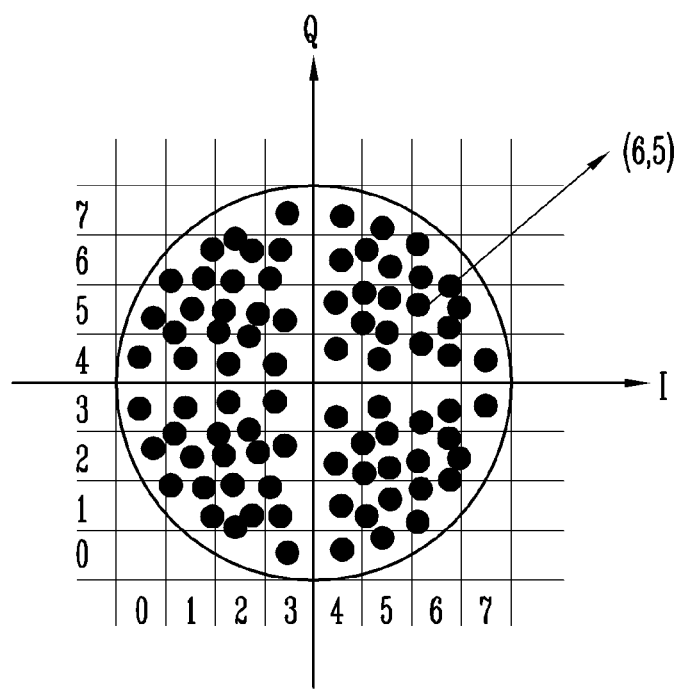
FIG. 5 is a graph illustrating an x polarized optical source noise component generated in the embodiment of FIG. 3 on a cartesian coordinate plane.
Figure 6:
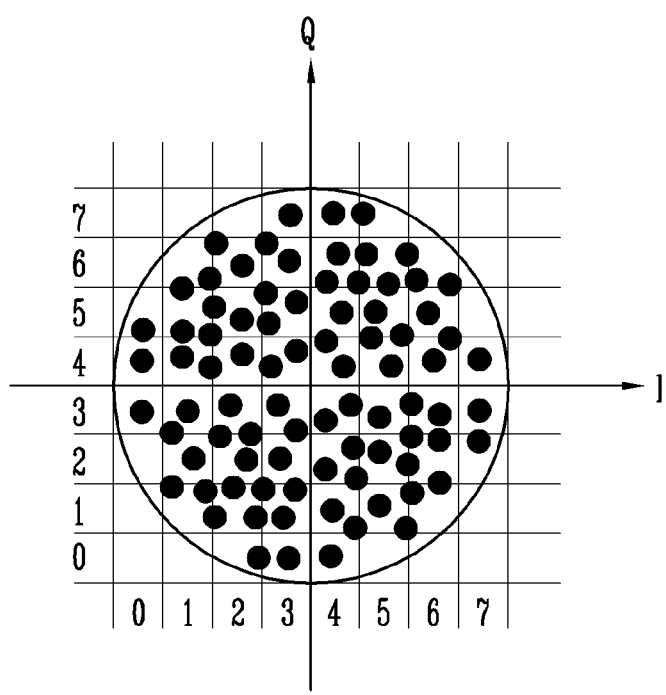
FIG. 6 is a graph illustrating a y polarized optical source noise component generated in the embodiment of FIG. 3 on a cartesian coordinate plane.

A random number generation principle of the embodiments of the present invention will be described with reference to FIGS. 5 and 6. For example, the in-phase component 41 and the quadrature component 42 of the X polarized noise according to the embodiment of FIG. 3 may be respectively sampled by the first and second high speed AD converters 261 and 262 so that a random number sequence may be generated at a high speed of GHz, which is illustrated in FIG. 5. FIG. 6 illustrates a result of sampling the in-phase component 43 and the quadrature component 44 of the Y polarized noise according to the embodiment of FIG. 3 by the third and fourth high speed AD converters 263 and 264.

FIG. 5 is a graph illustrating values obtained when an electric noise of an X polarized component divided into an in-phase component and a quadrature component by a high speed AD converter having resolution of three bits. In FIG. 5, an X axis illustrates the in-phase component I and a Y axis illustrates a quadrature component Q. For example, in the graph of FIG. 5, in X polarization, it is measured that the in-phase noise component is 6 and the quadrature noise component is 5, which is (6,5). Therefore, 6 is output from the first AD converter 261 and 5 is output from the second AD converter 262. X axis numbers of the respective points of FIG. 5 are output from the first AD converter and Y axis numbers of the respective points of FIG. 5 may be output from the second AD converter.

The random number extractor 270 determines 0 or 1 based on outputs from the first and second AD converters 261 and 262. For example, 0 or 1 is determined by 6 output from the first AD converter 261. In such a method, a random number sequence including 0s and 1s is generated based on a plurality of numbers output from the first AD converter and the generated random number sequence is output through the first channel 271. In addition, 0 or 1 is determined by 5 output from the second AD converter 262. In such a method, as illustrated in FIG. 5, a random number sequence including 0s and 1s is generated based on a plurality of numbers output from the second AD converter and the generated random number sequence is output through the second channel 272.

FIG. 6 is a graph illustrating values obtained when an electric noise of an Y polarized component divided into an in-phase component and a quadrature component by a high speed AD converter having resolution of three bits. In FIG. 6, an X axis illustrates the in-phase component I and a Y axis illustrates the quadrature component Q. The third AD converter 263 outputs X axis numbers of the respective points of FIG. 6 and the fourth AD converter 264 may output Y axis numbers of the respective points of FIG. 6. The random number extractor 270 respectively generates the unbiased random number sequences based on the numbers output from the third and fourth AD converters and may output the respective random number sequences through the third and fourth channels 273 and 274.

As illustrated in FIGS. 5 and 6, since a noise component may be independently and randomly measured on a cartesian coordinate plane at an arbitrary point, multiple outputs may be performed.

According to the present invention, a configuration of an optical hybrid included in a coherent optical receiver is applied to coherently measuring a phase noise or a magnitude noise of a light source on a cartesian coordinate plane. Therefore, a quantum physics based high speed true random number generator having multiple outputs is implemented.

In the above embodiments, the in-phase component and the quadrature component of the optical source noise are respectively independently measured so that the random number sequence may be output through two channels and may be independently measured by polarized component so that the random number sequence may be output through four channels. In addition, in the above embodiment, since a random number extractor is arranged at an output end of an AD converter, a true random number generator is implemented and sampling is performed by a high speed AD converter so that a random number sequence is generated at a high speed.

What is claimed is:

1. A multiple output quantum random number generator comprising:
   an optical hybrid including first and second input ports to which optical source noises are respectively input, the optical hybrid configured to mix a first optical source noise input to the first input port and a second optical source noise input to the second input port and to divide a mixed optical source noise into an in-phase component and a quadrature component;
   a plurality of optical detectors configured to respectively convert optical source noises of in-phase components and optical source noises of quadrature components that are output from the optical hybrid into electric noises;
   a plurality of analog-to-digital (AD) converters configured to respectively convert electric noises output from the plurality of optical detectors to digital values; and
   a random number extractor, including a first channel and a second channel, configured to post-process outputs of AD converters to thereby generate two true random number sequences, and to respectively output the two random number sequences through the first and second channels.

2. The multiple output quantum random number generator of claim 1, wherein the random number extractor outputs the random number sequences from which biased components of 0s and 1s are removed.

3. The multiple output quantum random number generator of claim 1, wherein
   the first optical source noise and the second optical source noise have the same polarization state;
   the random number sequence outputted through the first channel is generated based on an electric noise of an in-phase component sampled by one of the plurality of AD converters; and
   the random number sequence outputted through the second channel is generated based on an electric noise of a quadrature component sampled by one of the plurality of AD converters.

4. The multiple output quantum random number generator of claim 3, further comprising a polarization splitter configured to divide an optical source noise into an X polarized component and a Y polarized component,
   wherein an optical source noise output from the polarization splitter is input to at least one of the first input port of the optical hybrid and the second input port of the optical hybrid.

5. The multiple output quantum random number generator of claim 1, further comprising at least one optical splitter configured to divide an optical source noise,
   wherein at least one of two optical source noises divided by the optical splitter is input to the optical hybrid.

6. The multiple output quantum random number generator of claim 5,
   wherein optical source noises input to the optical splitter are X polarized or Y polarized, and
   wherein, in the optical hybrid, two optical source noises divided by the optical splitter are respectively input as a first optical source noise and a second optical source noise.

7. The multiple output quantum random number generator of claim 1, further comprising:
   at least one optical splitter configured to divide an optical source noise; and
   a plurality of polarization splitter configured to divide an optical source noise divided by the optical splitter into an X polarized component and a Y polarized component,
   wherein the optical hybrid comprises:
   a first optical hybrid to which optical source noises of X polarized components respectively output from the plurality of polarization splitter are input; and
   a second optical hybrid to which optical source noises of Y polarized components respectively output from the plurality of polarization splitter are input.

8. The multiple output quantum random number generator of claim 7, wherein the plurality of optical detectors respectively convert an optical source noise of an X polarized in-phase component output from a first optical hybrid, an optical source noise of an X polarized quadrature component output from a first optical hybrid, an optical source noise of a Y polarized in-phase component output from a second optical hybrid, and an optical source noise of a Y polarized quadrature component output from a second optical hybrid into electric noises.

9. The multiple output quantum random number generator of claim 8, wherein the random number extractor has a plurality of channels including the first and second channels, post-processes the outputs of AD converters to thereby generate a plurality of random number sequences including the two random number sequences, and respectively outputs the plurality of random number sequences through the plurality of channels, the plurality of random number sequences including at least two of a first random number sequence generated based on an electric noise of an X polarized in-phase component sampled by one of the plurality of AD converters, a second random number sequence generated based on an electric noise of an X polarized quadrature component sampled by one of the plurality of AD converters, a third random number sequence generated based on an electric noise of a Y polarized in-phase component sampled by one of the plurality of AD converters, and a fourth random number sequence generated based on an electric noise of a Y polarized quadrature component sampled by one of the plurality of AD converters.

10. The multiple output quantum random number generator of claim 1, further comprising at least one light source configured to generate the optical source noise.

11. The multiple output quantum random number generator of claim 10, wherein the at least one light source comprises a laser light source or a spontaneous emission light source.

\* \* \* \* \*